United States Patent [19]

Rhoades et al.

[11] Patent Number: 4,838,986
[45] Date of Patent: Jun. 13, 1989

[54] TOOL FOR APPLYING BODY SIDE MOLDING STRIP

[76] Inventors: James J. Rhoades, 30924 Rosslyn, Garden City, Mich. 48135; Steven D. Kopriva, 2740 Pine Ridge Dr., West Bloomfield, Mich. 48033

[21] Appl. No.: 938,836

[22] Filed: Dec. 8, 1986

[51] Int. Cl.$^4$ ............................................. B32B 35/00
[52] U.S. Cl. .................................. 156/574; 29/110.5; 29/121.6; 156/579
[58] Field of Search ............... 156/579, 574; 29/110.5, 29/121.6; 15/230.11

[56] References Cited

U.S. PATENT DOCUMENTS

| | | | |
|---|---|---|---|
| 132,736 | 11/1872 | Peirce | 29/110.5 |
| 3,127,299 | 3/1964 | Hecht | 29/110.5 |
| 3,157,135 | 11/1964 | Fetrow et al. | 29/110.5 |
| 3,540,104 | 11/1970 | Duffy | 29/110.5 |
| 4,314,395 | 2/1982 | Brock | 156/579 |

FOREIGN PATENT DOCUMENTS 757659  9/1956  United Kingdom ............. 15/230.11

*Primary Examiner*—Michael Wityshyn
*Attorney, Agent, or Firm*—Barnes, Kisselle, Raisch, Choate, Whittemore & Hulbert

[57] ABSTRACT

A tool for applying a molding strip on automobile and the like wherein the strip has a pressure sensitive adhesive or spring loaded clips thereon comprising a body defining a handle, a pair of rollers rotatably mounted at each end of the body in close proximity to the body. The length of the handle is preferably equal to the width of a human hand. The position and size of the rollers is such that the space between the handle and the strip which is to be applied is only sufficient for the fingers of the hand. Each roller has a configuration including a centrally located annular groove about the periphery and spaced radial edges about the periphery such that when the molding is placed on a surface of the automobile, the tool is gripped and placed on the strip with the rollers engaging the molding and the tool is moved longitudinally while applying pressure successively and continuously to the strip.

16 Claims, 1 Drawing Sheet

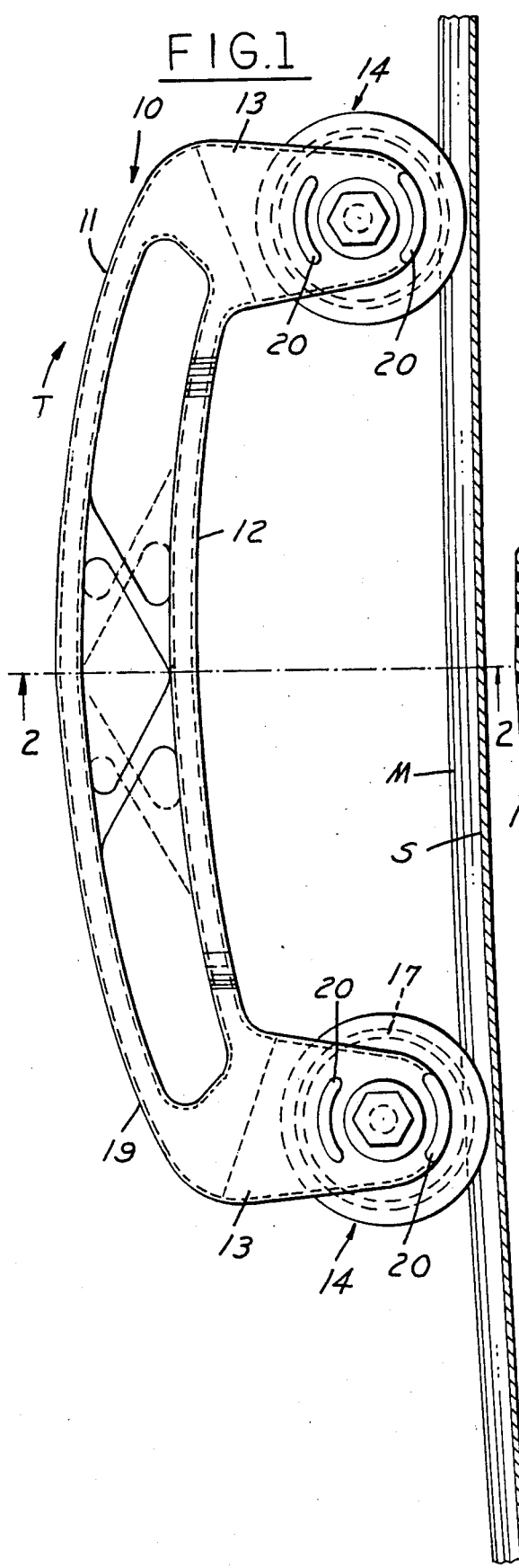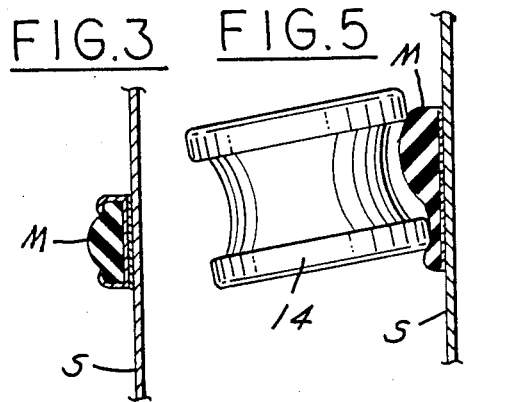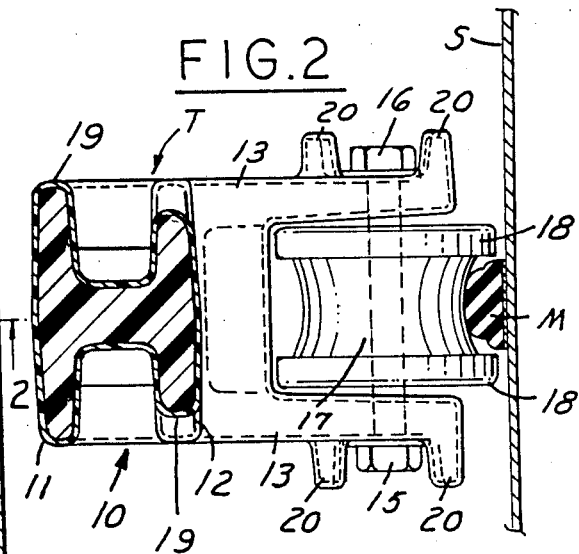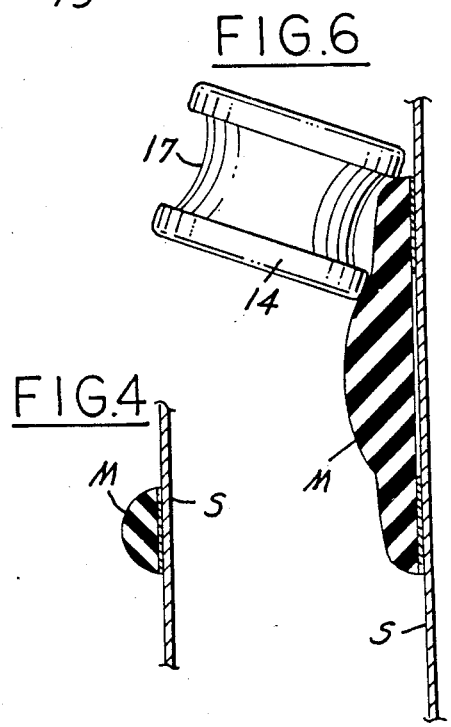

TOOL FOR APPLYING BODY SIDE MOLDING STRIP

This invention relates to tools for applying molding strips on automobiles and the like.

BACKGROUND AND SUMMARY OF THE INVENTION

It is common to provide body side molding strips with a pressure sensitive adhesive on one surface thereof to portions of an automobile such as the door panels and the like. In order to insure that the molding strips are applied properly, it is recommended by molding manufacturers that hand pressure be provided using the heel of the hand through a soft cloth or a rubber mallet on the molding strip along the length thereof. One manufacturer calls for rubbing the strip hard at least six times to insure a maximum bond or pressing hard with a blunt object. Such procedures not only are difficult and time consuming but also do not assure uniformity of pressure. In addition, there is a tendency to dent or buckle the body panel due to excess pressure.

Among the objectives of the present invention are to provide a tool which will effectively cause adherence of the strip along its entire length; which is easy to use; which will quickly apply the strip; and which is relatively light in weight.

In accordance with the invention, the tool for applying a molding strip on automobiles and the like wherein the strip has a pressure sensitive adhesive thereon comprising a body defining a handle, a pair of roller rotatably mounted at each end of the body in close proximity to the body. The length of the handle is preferably equal to the width of a human hand. The position and size of the rollers is such that the space between the handle and the strip which is to be applied is only sufficient for the fingers of the hand. Each roller has a configuration including a centrally located annular groove about the periphery and spaced radial edges about the periphery such that when the molding is placed on a surface of the automobile, the tool is gripped and placed on the strip with the rollers engaging the molding and the tool is moved longitudinally while applying pressure successively and continuously to the strip.

DESCRIPTION OF THE DRAWINGS

FIG. 1 is a fragmentary side elevational view of the tool embodying the invention in position on a molding strip.

FIG. 2 is a fragmentary sectional view taken along the line 2—2 in FIG. 1.

FIGS. 3 and 4 are sectional views of different types of molding strips which can be applied using the tool.

FIG. 5 is a partly diagrammatic sectional view showing how the tool can be used on another type of molding strip.

FIG. 6 is a partly diagrammatic sectional view showing how the tool can be used on another type of molding strip.

DESCRIPTION

Referring to FIGS. 1 and 2, the tool T for applying molding strips comprises a body 10 defining a handle which extends generally longitudinally and has another outer surface 11, an inner surface 12 and spaced sets of integral flanges 13 extending transversely on the ends of the body. A roller 14 is rotatably mounted at each end between integral flanges 13 portions by an axle defined by a bolt 15 and nut 16 threaded on the threaded end of bolt 15. Alternatively a clevis pin and cotter pin can be used. Each roller 14 includes a concave annular groove 17 and radially extending spaced annular flanges 18 on the edges of the groove 17. The body 10 is preferably made of metal such as aluminum or plastic and the rollers 14 are preferably made of a polymer such as polyethylene to prevent marring the surfaces to which the strip is applied in case of inadvertent engagement of the roller 14 with the surface. If made of metal, the body 10 is preferably coated with a plastic coating 19 such as rubber in order to prevent marring of the surface by inadvertent engagement of the body 10 with the body.

The outer surface 11 of the body 10 preferably is convex in a direction longitudinally of the body and the inner surface 12 of the body 10 is preferably substantially concave in a direction longitudinally of the body 10 to facilitate gripping of the body 10 by the human hand. The surfaces 11, 12 are preferably flat in a transverse direction and have a width such that the body 10 can be readily grasped by the human hand and will fit in the palm. At the same time, the width is sufficient to distribute the force of the hand over a wide area. The surfaces 11, 12 are flat, but can be any strongly, grippable form, such as a pistol-type grip. The length of flanges 13 and the size of the rollers 14 is such that the axis of the rollers is close to the body 10. Preferably, the distance between surface 12 and the strip is only sufficient to accommodate the fingers and thumb of the human hand. In this manner, the tool T has greater stability when force is applied to the tool T.

Integral spaced flanges 20 on the body 10 extend transversely beyond the head of axle 15 and the end of fastener 15 so that they will not inadvertently contact the surface S.

In use, the customary protective backing is removed to expose the pressure sensitive, glued surface of the molding strip M and molding M is applied in horizontal position against the surface S of a body panel of the automobile such as a door or the like. The tool T is then grasped and the rollers are engaged with the strip M. The tool T is moved progressively along the strip M while applying lateral pressure on the strip distributing the pressure to uniformly apply a smooth even pressure and thereby insure solid adhesion. This permits the strip to be applied quickly without the use of cloths or other tools such as mallets. In addition, deflection of the body panel is eliminated.

The tool is constructed and arranged such that there is minimal distance between the handle and the molding strip. In this manner, maximum pressure can be applied without any tendency of the handle to be unstable and oscillate transversely with respect to the strip.

As shown in FIGS. 3-6, the tool can be utilized for applying molding strips of various configurations. Where the molding strip is wider than the rollers, the tool can be tilted as shown in FIGS. 5 and 6. When the molding strip has a greater width that the rollers 14, as shown in FIG. 6, the roller is tilted to apply pressure along the one edge and moved longitudinally while applying pressure, then applied to the center portion without tilting and moved longitudinally while applying pressure, and then tilted in the opposite direction to apply pressure to the other longitudinal edge and moved longitudinally while applying pressure.

It can thus be seen that there has been provided a tool which will effectively and quickly apply the molding strip which applies a uniform pressure without excessive pressure such as might deflect the surface or panel to which the strip is being applied.

We claim:

1. A tool comprising
an elongated body defining a handle,
a pair of rollers for applying a molding strip onto an automobile or the like,
each said roller having an annular groove about the central portion thereof which is concave in cross section and has integral radial flanges extending radially beyond the edges of the groove about the periphery of the groove,
means at each end of the handle for mounting a said roller for rotation about transverse axes with respect to the handle,
the length of the handle being about the width of the hand,
the position and size of the rollers being such that the palm can engage the outer surface of the handle and the fingers and the thumb can be wrapped about the handle,
the distance between the underside of the handle and the surface to which the strip is applied being such to accommodate fingers and the hand but at the same time maintaining minimal distance between the handle and the strip, such that when the strip is placed on a surface and the rollers are engaged with the strip, movement of the tool along the length of the strip will progressively apply pressure to all points along the length of the strip without excessive pressure at any point so that solid adhesion is achieved and application time is reduced.

2. The tool set forth in claim 1 wherein said body is made of metal and is coated with a protective coating to prevent marring of the surface to which the strip is applied.

3. The tool set forth in claim 2 wherein said coating comprises a polymer.

4. The tool set forth in claim 2 wherein said body is made of aluminum.

5. The tool set forth in claim 4 wherein said coating comprises rubber or vinyl.

6. The tool set forth in claim 1 wherein the body is made of a non-marring material with sufficient strength to withstand the application of pressure.

7. The tool set forth in claim 1 wherein said rollers are made of nylon or polyethylene.

8. The tool set forth in claim 1 wherein said means for mounting each said roller comprises integral flanges extending transversely from the handle and an axle mounted between the flanges, said rollers being mounted on said axles.

9. A tool comprising
an elongated body defining a handle,
a pair of rollers for applying a molding strip onto an automobile or the like,
each said roller having an annular groove about the central portion thereof which is concave in cross section and has integral radial flanges extending radially beyond the edges of the groove about the periphery of the groove,
means at each end of the handle for mounting a said roller for rotation about transverse axes with respect to the handle,
said means for mounting each said roller comprising integral flange portions extending transversely from the handle and an axle mounted between the flange portions, said rollers being mounted on said axles,
the length of the handle being about the width of the hand,
the position and size of the rollers being such that the palm can engage the outer surface of the handle and the fingers and the thumb can be wrapped about the handle,
the distance between the underside of the handle and the surface to which the strip is applied being such to accommodate fingers and the hand but at the same time maintaining minimal distance between the handle and the strip,
said body having an outer surface and an inner surface on the underside of the handle adjacent said rollers, said outer surface being convex in longitudinal cross section along an axis perpendicular to the roller axes,
said outer surface of said body having a width such that it is readily grasped and fits within the palm of the hand while at the same time the force of the palm of the hand is distributed over a wide area of the body,
such that when the strip is placed on a surface and the rollers are engaged with the strip, movement of the tool along the length of the strip will progressively apply pressure to spaced points along the length of the strip without excessive pressure at any point so that solid adhesion is achieved and application time is reduced.

10. The tool set forth in claim 9 wherein said body is made of metal and is coated with a protective coating to prevent marring of the surface to which the strip is applied.

11. The tool set forth in claim 10 wherein said coating comprises rubber or vinyl.

12. The tool set forth in claim 11 wherein said body is made of aluminum.

13. The tool set forth in claim 9 wherein said rollers are made of nylon or polyethylene.

14. The tool set forth in claim 9 wherein said handle has an inner surface which is concave in longitudinal cross section along an axis perpendicular to the roller axes.

15. A tool comprising
an elongated body defining a handle,
a pair of rollers for applying a molding strip onto an automobile or the like,
means at each end of the handle for mounting a said roller for rotation about transverse axes with respect to the handle,
the length of the handle being about the width of the hand,
the position and size of the rollers being such that the palm can engage the outer surface of the handle and the fingers and the thumb can be wrapped about the handle,
said means for mounting each said roller comprising integral flanges extending transversely from the handle and an axle mounted between the flanges, said rollers being mounted on said axles,
said integral flanges including transversely extending portions extending transversely from the integral flanges and beyond the integral flanges for protecting protruding portions of the axle for marring the surface to which the strip is being applied,
the distance between the underside of the handle and the surface to which the strip is applied being such to accommodate fingers and the hand but at the same time maintaining minimal distance between the handle and the strip, such that when the strip is placed on a surface and the rollers are engaged with the strip, movement of the tool along the length of the strip will progressively apply pressure to all points along the length of the strip without excessive pressure at any point so that solid adhesion is achieved and application time is reduced.

16. A tool comprising an elongated body defining a handle, a pair of rollers for applying a molding strip onto an automobile or the like, each said roller having an annular groove about the central portion thereof which is concave in cross section and has integral radial flanges extending radially beyond the edges of the groove about the periphery of the groove, means at each end of the handle for mounting a said roller for rotation about transverse axes with respect to the handle, said means for mounting each said roller comprising integral flange portions extending transversely from the handle and an axle mounted between the flange portions, said rollers being mounted on said axles, the length of the handle being about the width of the hand, the position and size of the rollers being such that the palm can engage the outer surface of the handle and the fingers and the thumb can be wrapped about the handle, the distance between the underside of the handle and the surface to which the strip is applied being such to accommodate fingers and the hand but at the same time maintaining minimal distance between the handle and the strip, said body having the outer surface and an inner surface on the underside of the handle adjacent said rollers, said outer surface being convex in longitudinal cross section along an axis perpendicular to the roller axes, said outer surface of said body having a width such that it is readily grasped and fits within the palm of the and while at the same time the force of the palm of the hand is distributed over a wide area of the body, such that when the strip is placed on a surface and the rollers are engaged with the strip, movement of the tool along the length of the strip will progressively apply pressure to spaced points along the length of the strip without excessive pressure at any point so that solid adhesion is achieved and application time is reduced, said flange portions including transversely extending portions extending transversely beyond the flange portions for protecting protruding portions of the axle from the surface to which the strip is being applied.

* * * * *